April 28, 1953 — H. J. KLINE — 2,636,708
APPLIANCE BRACKET
Filed March 25, 1947 — 3 Sheets-Sheet 1
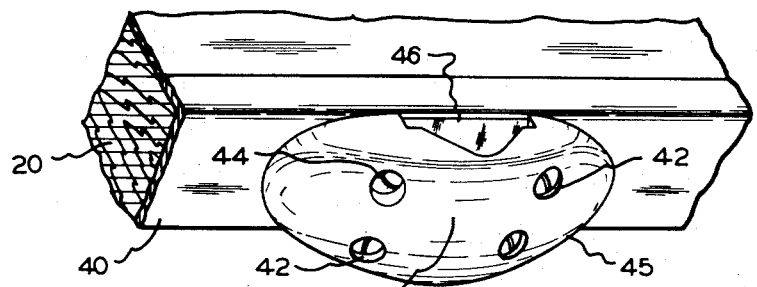
FIG. VI.
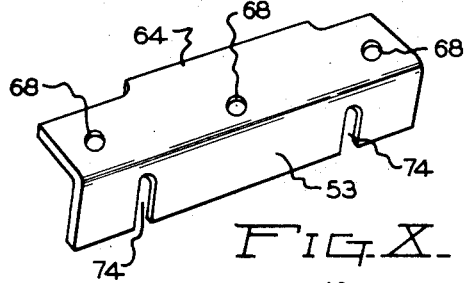
FIG. X.
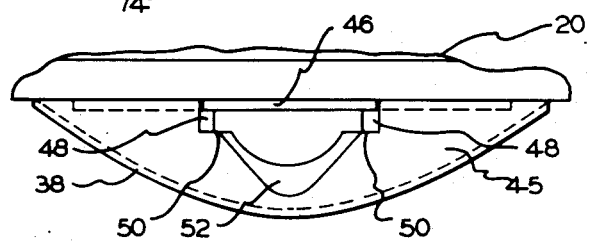
FIG. VII.
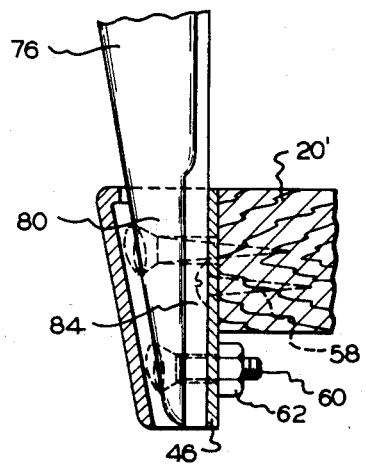
FIG. XIII.
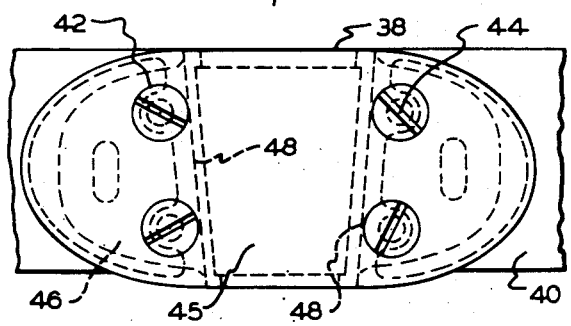
FIG. VIII.
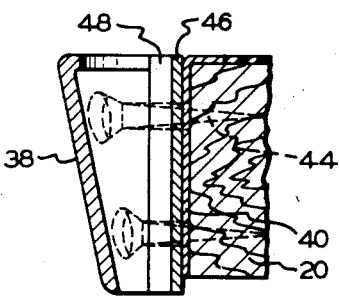
FIG. IX.
Inventor
HERBERT J. KLINE
By Beaman & Patch
Attorneys April 28, 1953      H. J. KLINE      2,636,708
APPLIANCE BRACKET
Filed March 25, 1947      3 Sheets-Sheet 2
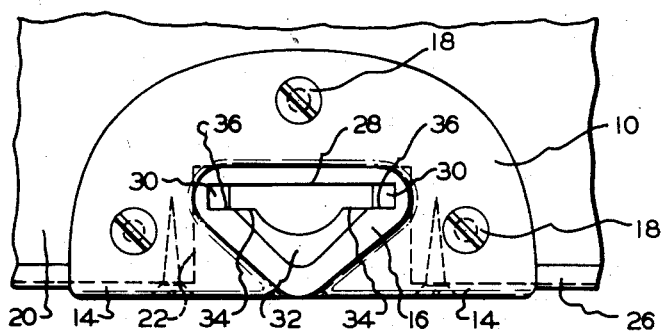
FIG. I.
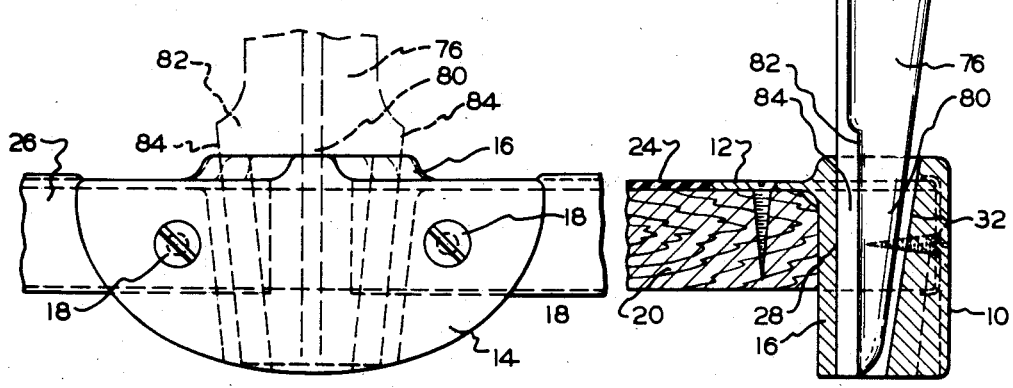
FIG. IV.      FIG. V.
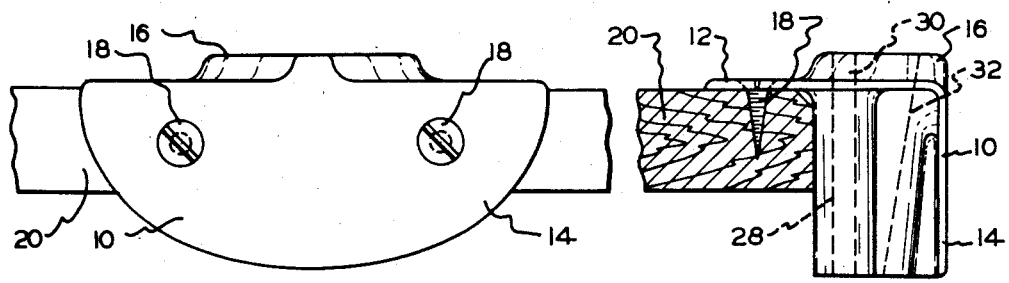
FIG. II.      FIG. III.
Inventor
HERBERT J. KLINE
By Beaman & Patch
Attorneys April 28, 1953 H. J. KLINE 2,636,708
APPLIANCE BRACKET
Filed March 25, 1947 3 Sheets-Sheet 3
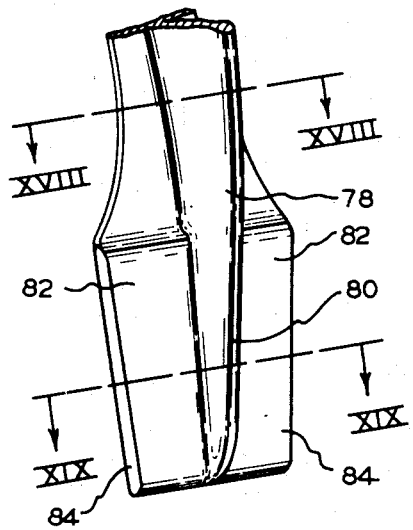
FIG. XVII.
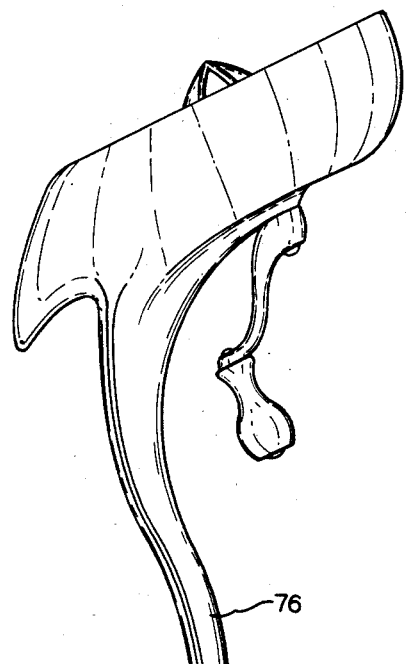
FIG. XVI.
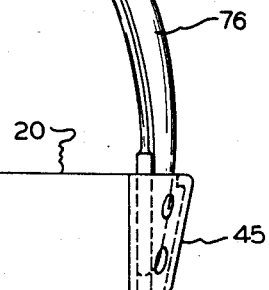
FIG. XVIII.
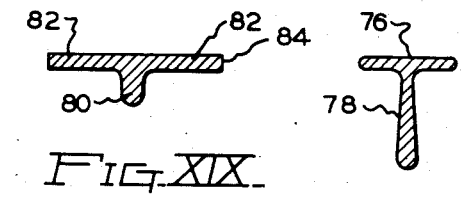
FIG. XIX.
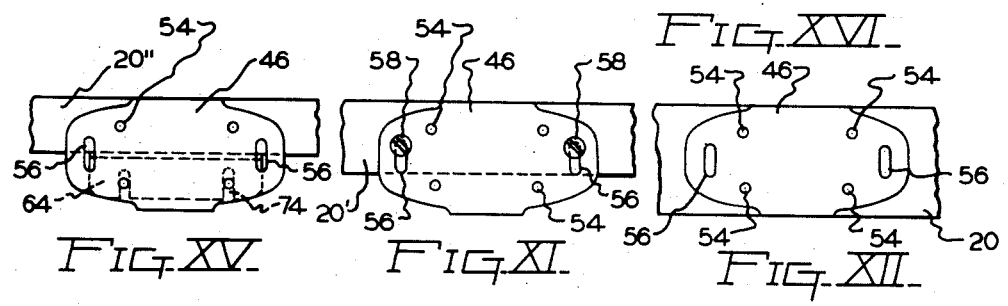
FIG. XV. FIG. XI. FIG. XII.
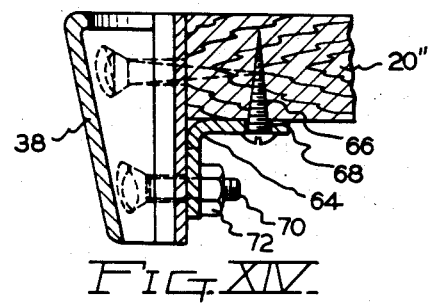
FIG. XIV.
Inventor
HERBERT J. KLINE
By Beaman & Patch
Attorneys Patented Apr. 28, 1953

2,636,708

UNITED STATES PATENT OFFICE 2,636,708

APPLIANCE BRACKET

Herbert J. Kline, Jackson, Mich., assignor, by mesne assignments, to National Die Casting Company, Chicago, Ill., a corporation of Illinois Application March 25, 1947, Serial No. 737,055

2 Claims. (Cl. 248—224)

The invention relates to improvements in socket bracket and insert support construction for the support of kitchen appliances such as meat grinders, juicers, ricers and the like.

It is an object of the invention to provide a socket bracket structure which is so designed as to be adapted to the numerous constructions of kitchen tables, cabinets, work benches and the like.

Another object is to provide an improved bracket and support for kitchen appliances in which the support is removably inserted in a socket portion of the bracket.

A further object is an improved socket and insert combination for the class of goods described in which the insert is of tapered T-section with the socket having a narrow tapered portion given support only to the cross portion of the T-section.

A still further object of the invention is to provide an improved bracket and adapter plate assembly for installation of the bracket on both metal and wooden tables and cabinets of different thickness and edge flange structure.

These and other objects and advantages of the invention residing in specific details of construction will more fully appear from a detail consideration of the following specification and claims.

In the drawings,

Fig. 1 is a plan view of one form of bracket shown attached to the table top,

Fig. 2 is a front elevational view of Fig. 1,

Fig. 3 is an end view with the table shown in section,

Fig. 4 is a view similar to Fig. 2 shown with the insert support in position,

Fig. 5 is a cross sectional view taken thru the construction of Fig. 4 with the insert shown in full line, Fig. 6 is a perspective view of another form of bracket shown attached to the top of the table top, Fig. 7 is a plan view of the construction shown in Fig. 6, Fig. 8 is a front view of the construction shown in Fig. 7, Fig. 9 is a vertical cross sectional view of Fig. 8, Fig. 10 is a perspective view of an extension angular plate, Fig. 11 is a front view of the adapter plate applied to a thin top table, Fig. 12 is a view similar to Fig. 11 of the adapter plate as used in Fig. 8, Fig. 13 is a vertical cross section view thru the bracket and adapter plate as applied to a thin top table, Fig. 14 shows a modified arrangement for mounting the bracket on a thin top table, Fig. 15 illustrates the arrangement of mounting plates shown in Fig. 14, Fig. 16 is a side elevational view of the appliance supported in the bracket of Fig. 6, Fig. 17 is a fragmentary perspective view of the lower end of the insert support, Fig. 18 is a cross section view taken on line XVIII of Fig. 17, and Fig. 19 is a cross section view taken on line XIX of Fig. 17.

The socket bracket 10 shown in Figs. 1 to 5 inclusive, is of cast metal construction with a thin horizontal and vertical attachment flange portions 12 and 14 collectively embracing the central socket portion 16. Screws 18 attach the bracket 10 to the edge of the table top 20 which has been notched out at 22 to provide clearance for the portion 16. In Figs. 4 and 5, a suitable surface 24 such as linoleum has been applied to the top 20 flush with the flange 12. A moulding 26 may be as indicated along the edge of the top 20, the surface 24 and molding 26 being standard trim on most kitchen tables and cabinets.

As more clearly shown in Figs. 1 and 5, the socket portion 16 has a flat vertical wall 28, converging walls 30, and an angular wall 32 inclined downwardly and inwardly toward the wall 28 with junctions at 34 with the walls 36 in spaced relations with the wall 28. It will be observed that the walls 28, 30 and 36 form a narrow socket tapered in one direction. The angular, inclined wall 32 opens into this tapered socket to provide clearance for one leg of the T-section insert support as will be more fully described, hereinafter.

A modified form of socket bracket 38 is shown in Figs. 6 to 9, inclusive. This form has no horizontal attachment flange, being designed to be entirely supported upon the vertical edge 40 of the top 20. Openings 42 are provided in the casting 45 to receive screws, bolts or the like 44. Preferably the casting 45 is recessed at the back to provide clearance for the attachment plate 46. The plate 46 serves the function of the wall 28 in the form of Fig. 1 by providing a narrow tapered socket with the tapered walls 48, and the spaced vertical walls 50. The angular inclined clearance wall 52 opens into this narrow tapered socket as in the form of Fig. 1.

Referring to Fig. 12, the plate 46 is shown in the position it takes on the edge of the top 20 back of the casting 45 of Fig. 8. Holes 54 are provided for the fasteners 44. The elongated holes 56 are provided for screws 58 when the bracket is to be attached to a narrow top 20' as shown in Fig. 13. With this type of installation, the lower portion of the plate 46 extends below the top 20' and bolts 60 receive nuts 62 to clamp the lower portion of the bracket 38 to the plate 46.

In Fig. 14, the angular plate 64 of Fig. 10 is attached to the under side of the thin top 20" by screws 66 passed thru the holes 68. Bolts 70 extend thru the lower holes 42 in the bracket 38 with the nuts 72 clamping the plate 46 and bracket 38 to the plate 64, the bolts 70 passing thru the slots 74. In Fig. 15, the relative relation of the plates 46 and 64 is indicated prior to applying the fastening means.

The insert support for the kitchen appliance is illustrated in Figs. 16 to 19 inclusive. This support 76 is preferably of T-section with the lateral web portion 78 tapering off toward the lower end as at 80. At the lower end, the cross portion of the T-section is thickened as at 82 with slightly tapered edges 84. The thickness of the portion 82 is preferably uniform so as to snugly fit between the walls 28 and 36 of the socket 16 without binding. Likewise the taper of the edges 84 corresponds with the taper of the walls 30. As will be apparent from Fig. 5, the angular wall 32 provides clearance for the web 80 of the T-section. The arrangement is such that the insert support 76 is firmly held in the socket portion 16 without binding or sticking against removal.

It will be understood that numerous kitchen appliances will be provided with insert supports 76 which are inserted in the socket portion 16 when the use of the appliance is desired. The insert support 76 is received in the bracket 38 in the manner described relative to the form disclosed in Fig. 1.

Having thus described my invention, what I claim as new, and desire to protect by Letters Patent is:

1. A socket bracket adapted for the insertion of a tapered support thereinto in a substantially vertical direction, comprising a peripherally continuous body defining a central vertical socket, and including a web portion forming a front wall having a dished inner surface, upright flanges spaced laterally outwardly from said dished portion extending rearwardly from the front wall, and a rear wall including at least a part of the rear portion of the flanges and a removable cover plate extending between the flanges and disposed within the confines of the body, the rear surface of the rear wall lying in a single plane, said flanges having upright, interfacing shoulders providing a downwardly tapered guideway rearwardly of said front wall for wedgingly receiving the support, said body being of substantially uniform height in the regions adjacent the socket.

2. A socket bracket adapted for the insertion of a tapered support thereinto in a substantially vertical direction, comprising a body including a transversely extending web portion forming a front wall and having a convex front surface and rearwardly extending flanges at its ends, the inner surface of the web portion having a central downwardly tapering dished portion and substantially flat surfaces extending laterally outwardly from said dished portion, the flanges having inclined interfacing shoulders extending rearwardly from said flat surfaces defining a downwardly converging guideway, said flanges on their rear surfaces having aligned notches together defining a transversely extending recess, and a cover plate removably disposed in said recess forming a rear wall whereby the bracket is peripherally continuous around a socket defined by said cover plate with said shoulders and front wall, said cover plate at least in its portion between the flanges being of substantially the same height as said body whereby the bracket is of substantially uniform height in the regions adjacent the socket, the rear surfaces of said cover plate and flanges lying in a single plane.

HERBERT J. KLINE.

References Cited in the file of this patent

UNITED STATES PATENTS

| Number | Name | Date |
| --- | --- | --- |
| 177,471 | Clark | May 16, 1876 |
| 661,986 | Heizer | Nov. 20, 1900 |
| 809,670 | Covert | Jan. 9, 1906 |
| 999,733 | Ashmore | Aug. 8, 1911 |
| 1,162,653 | Rohan | Nov. 30, 1915 |
| 1,176,137 | Ette | Mar. 21, 1916 |
| 1,246,749 | Joiner | Nov. 13, 1917 |
| 1,286,376 | Madsen | Dec. 3, 1918 |
| 1,713,685 | Austin | May 21, 1929 |
| 2,173,159 | Ewan | Sept. 19, 1939 |

FOREIGN PATENTS

| Number | Country | Date |
| --- | --- | --- |
| 20,584 | Great Britain | Apr. 13, 1905 |